US010460160B2

(12) United States Patent
Leoni et al.

(10) Patent No.: US 10,460,160 B2
(45) Date of Patent: Oct. 29, 2019

(54) E-PAPER IMAGER

(71) Applicant: Hewlett-Packard Development Company, L.P., Houston, TX (US)

(72) Inventors: Napoleon J Leoni, Palo Alto, CA (US); Omer Gila, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 15/764,037

(22) PCT Filed: Oct. 29, 2015

(86) PCT No.: PCT/US2015/058091
§ 371 (c)(1),
(2) Date: Mar. 28, 2018

(87) PCT Pub. No.: WO2017/074396
PCT Pub. Date: May 4, 2017

(65) Prior Publication Data
US 2018/0239958 A1    Aug. 23, 2018

(51) Int. Cl.
*G06K 9/00*    (2006.01)
*G06K 7/14*    (2006.01)
*G06T 7/00*    (2017.01)
*B41J 3/407*   (2006.01)
*G06K 1/12*    (2006.01)
*G07F 7/08*    (2006.01)
*G02F 1/167*   (2019.01)

(52) U.S. Cl.
CPC ........ *G06K 9/00402* (2013.01); *B41J 3/4076* (2013.01); *G06K 1/128* (2013.01); *G06K 7/1417* (2013.01); *G06T 7/0002* (2013.01); *G07F 7/0846* (2013.01); *G02F 1/167* (2013.01); *G06T 2207/30168* (2013.01)

(58) Field of Classification Search
CPC .. G02F 1/167; G02F 1/133348; B41J 3/4076; G09G 3/344; G09G 2354/00; G09G 2380/14; G07F 7/0846; G06K 7/1417; G06K 9/00402; G06K 19/077; G09F 9/372
See application file for complete search history.

(56) References Cited

U.S. PATENT DOCUMENTS

| 7,284,708 B2 | 10/2007 | Martin |
| 2002/0141801 A1* | 10/2002 | Shimoda ............... B41J 3/4076 400/76 |
| 2005/0247797 A1 | 11/2005 | Ramachandran |
| 2006/0210339 A1 | 9/2006 | Shimoda et al. |

(Continued)

FOREIGN PATENT DOCUMENTS

| CN | 203950328 U | 11/2014 |
| DE | 202011051498 U1 | 1/2013 |

(Continued)

*Primary Examiner* — Li Liu
(74) *Attorney, Agent, or Firm* — Dicke Billig & Czaja PLLC

(57) ABSTRACT

An imager includes an ion-emitting unit and a conveying structure to move a passive e-paper display medium in a first orientation along a travel path and to releasably support the display medium in spaced relation to receive airborne ions from the ion-emitting unit for imaging operations.

14 Claims, 7 Drawing Sheets

(56) References Cited

U.S. PATENT DOCUMENTS

| | | |
|---|---|---|
| 2007/0283248 A1 | 12/2007 | Yoshida |
| 2011/0180599 A1 | 7/2011 | Hu et al. |
| 2011/0196740 A1 | 8/2011 | Pan |
| 2011/0298760 A1 | 12/2011 | Gila et al. |
| 2012/0206341 A1* | 8/2012 | Gila ................... B41J 3/4076 345/156 |
| 2012/0275726 A1 | 11/2012 | Queck et al. |
| 2012/0320001 A1* | 12/2012 | Gila ................... G02F 1/167 345/204 |
| 2013/0003162 A1* | 1/2013 | Leoni ................. G02F 1/167 359/296 |
| 2013/0235446 A1* | 9/2013 | Leoni ................. G02F 1/167 359/296 |
| 2014/0022625 A1 | 1/2014 | Fallon et al. |
| 2014/0239068 A1 | 8/2014 | Park |
| 2014/0240299 A1* | 8/2014 | Gila ................. G06F 3/03545 345/179 |
| 2014/0253426 A1* | 9/2014 | Leoni ................. G02F 1/167 345/107 |
| 2015/0246553 A1* | 9/2015 | Tamoto ............... G11B 9/063 347/199 |
| 2016/0293136 A1* | 10/2016 | Leoni ................. G06K 7/081 |
| 2016/0342063 A1 | 11/2016 | Gila |
| 2017/0052602 A1* | 2/2017 | Gila ................... B41J 2/415 |
| 2017/0060263 A1* | 3/2017 | Birecki ............... G02F 1/167 |
| 2017/0217207 A1* | 8/2017 | Birecki ............... B41J 2/415 |

FOREIGN PATENT DOCUMENTS

| | | |
|---|---|---|
| EP | 2833296 A1 | 2/2015 |
| KR | 20100039915 A | 4/2010 |
| WO | WO-2015-116216 A1 | 8/2015 |

\* cited by examiner

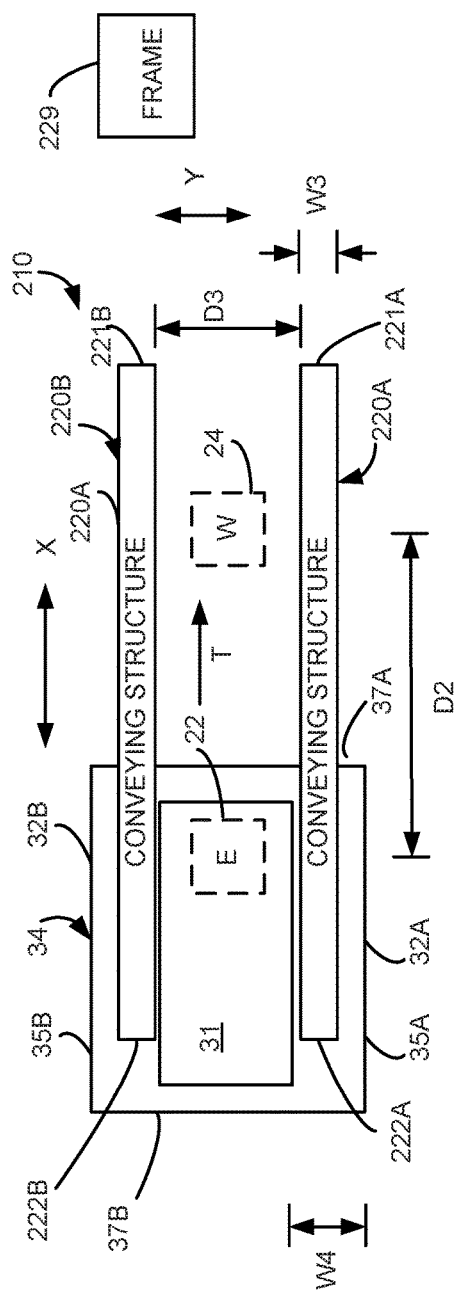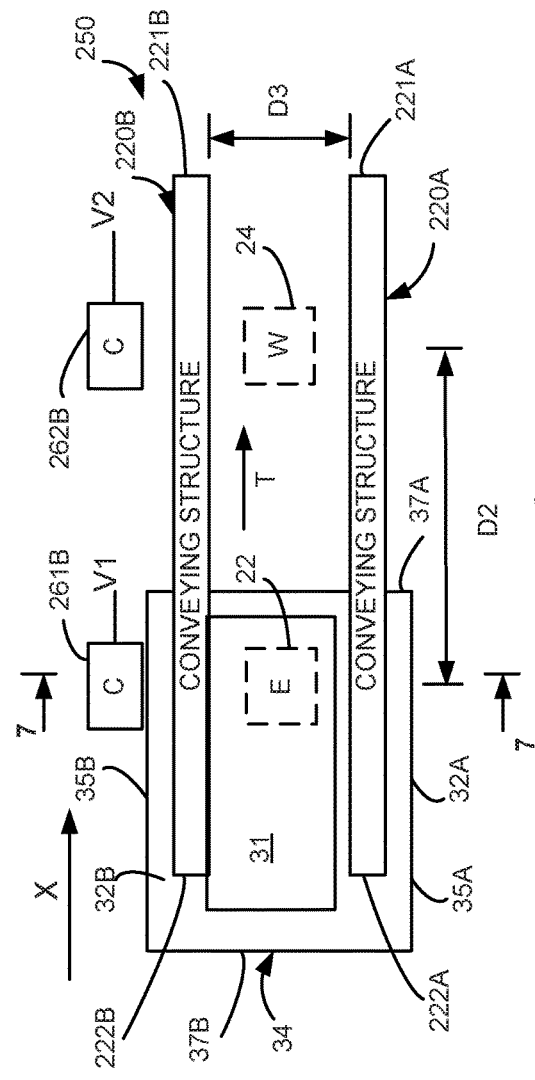

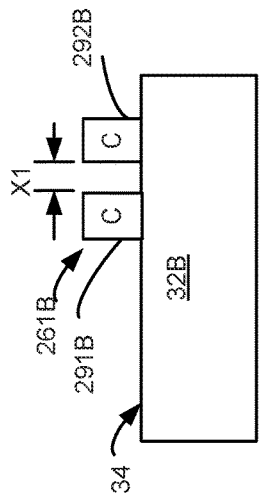
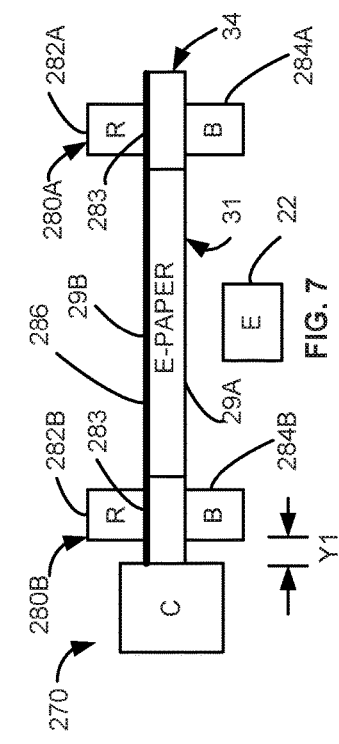
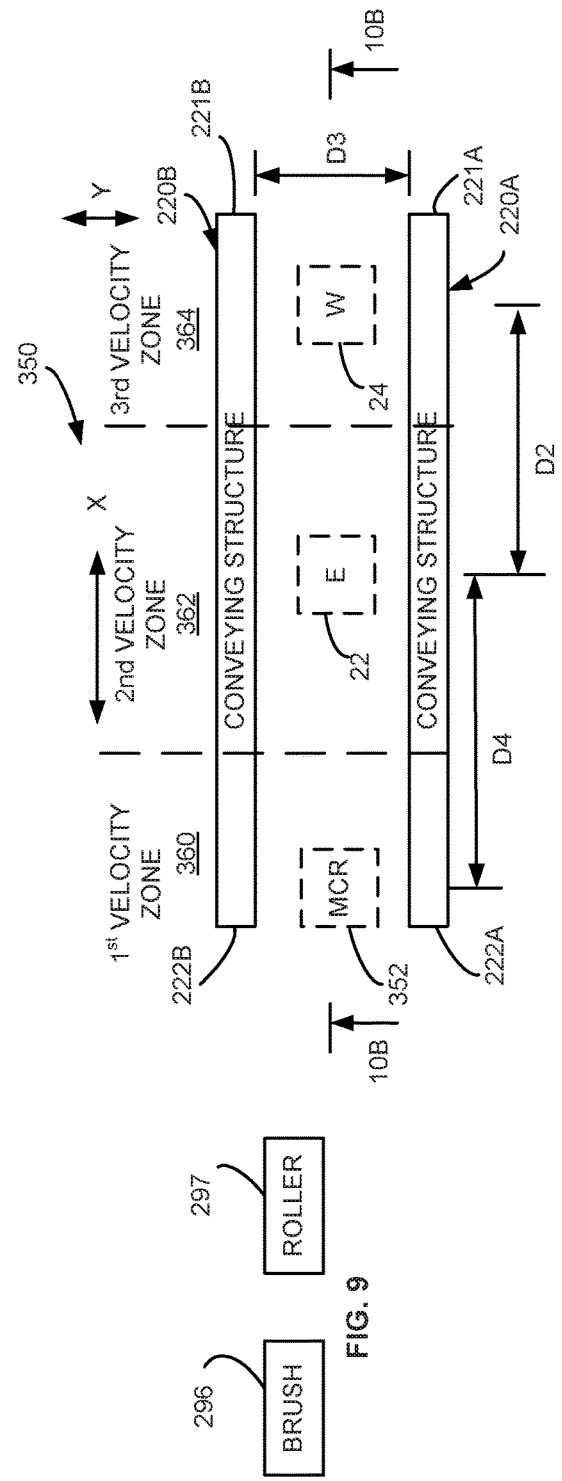

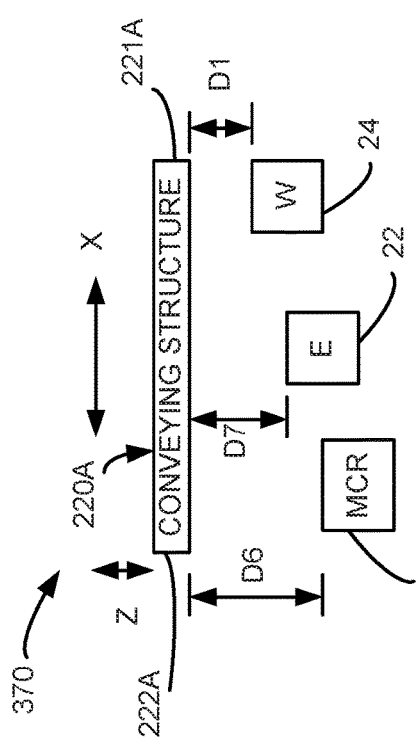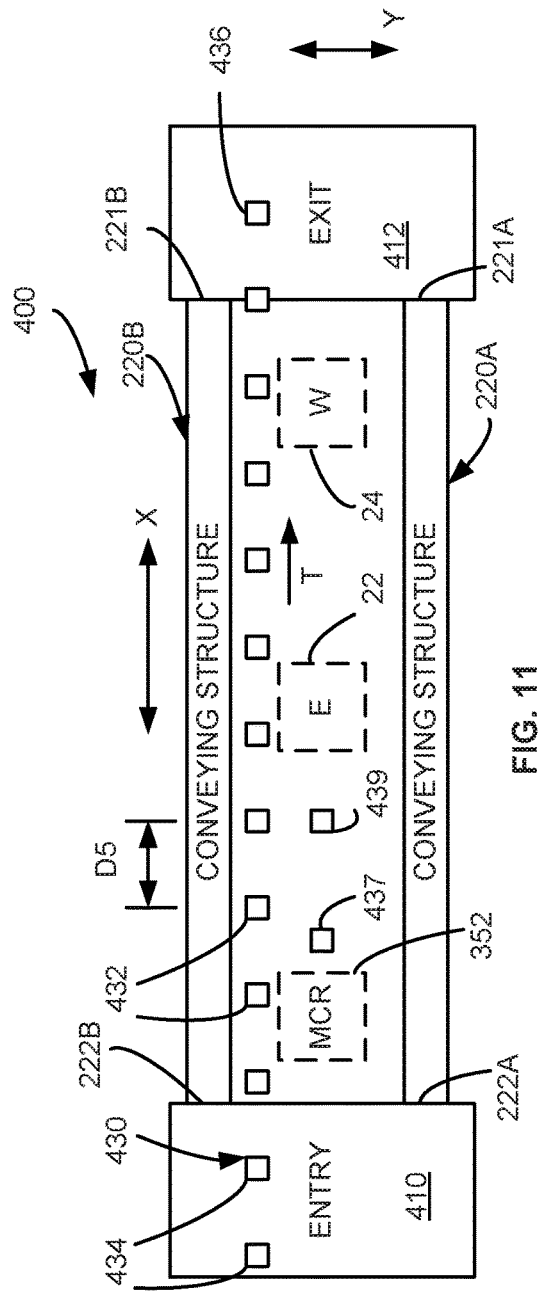

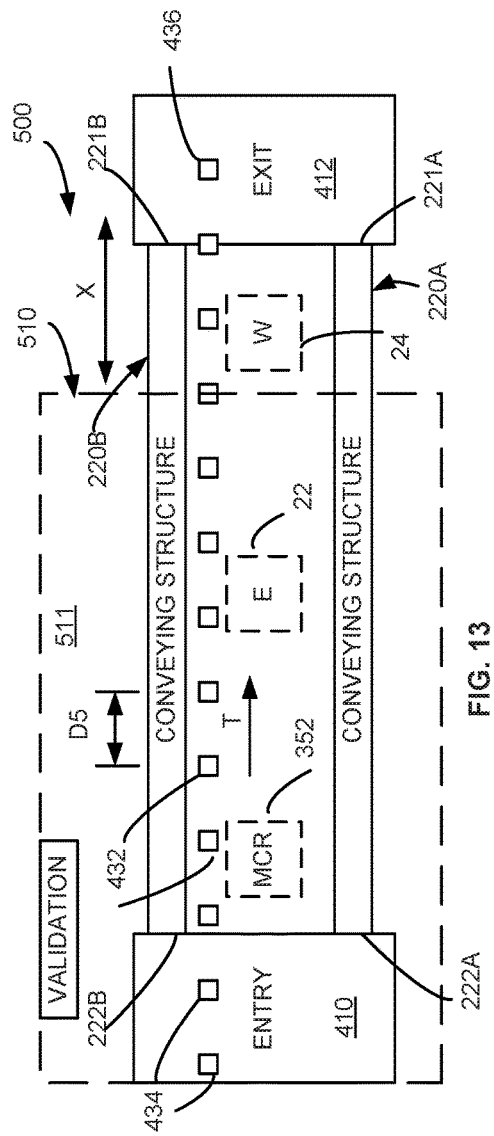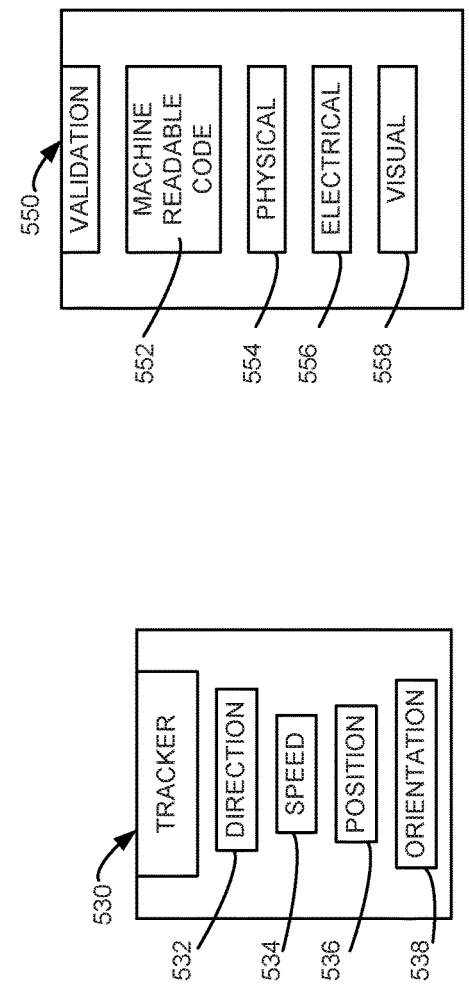

E-PAPER IMAGER

BACKGROUND

In some instances, electronic ("e-paper") is described as a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 5 is top plan view schematically representing an imager and a passive e-paper display medium, according to one example of the present disclosure.

FIG. 6 is a top plan view schematically representing an imager including conductive elements releasably engageable relative to a display medium, according to one example of the present disclosure.

FIG. 7 is an end view schematically representing an imager including a conductive element relative to a side edge of a display medium, according to one example of the present disclosure.

FIG. 8 is a partial top plan view schematically representing a pair of conductive elements relative to a side edge of a display medium, according to one example of the present disclosure.

FIG. 9 is a block diagram schematically representing conductive elements, according to one example of the present disclosure.

FIG. 10A is a top side plan view schematically representing an imager including a machine-readable-code reader and/or different velocity zones, according to one example of the present disclosure.

FIG. 10B is a side sectional view as taken along lines 10B-10B in FIG. 10 and schematically representing an imager, according to one example of the present disclosure.

FIG. 11 is a top plan view schematically representing an imaging including an array of location sensors and entry and exit portions, according to one example of the present disclosure.

FIG. 12 is a block diagram schematically representing a tracker module, according to one example of the present disclosure.

FIG. 13 is a top plan view schematically representing an imager similar to the imager of FIG. 11 and including a validation arrangement, according to one example of the present disclosure.

FIG. 14 is a block diagram schematically representing a validation module, according to one example of the present disclosure.

DETAILED DESCRIPTION

Figure 2:
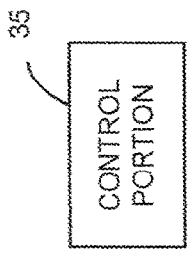
FIG. 2 is a block diagram schematically representing a control portion, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

In at least some examples, among other features and functions, various components of an imager provide for handling a passive e-paper display medium to facilitate quality imaging while preventing improper use of the imager and/or use of improper display mediums.

In some examples, an imager includes a frame defining a travel path along a first orientation and including an ion-emitting unit. In some examples, the ion-emitting unit includes an erasing unit and a writing unit spaced apart downstream from the erasing unit. The imager includes a conveying structure to move and releasably support a passive e-paper display medium in the first orientation in spaced relation to receive airborne ions from at least one of the respective erasing and writing units for imaging operations.

In some examples, the conveying structure releasably supports the display medium via releasable engagement of opposite faces of the display medium, while a conductive element is positioned to releasably contact a conductive portion of a side edge of the display medium to establish electrical communication between a power supply (e.g. voltage) and the first conductive portion.

In some examples, the display medium takes the form of a card, such as a financial transaction card, security/personnel badge, access card, etc. In some examples, such cards having a size and shape such as the ubiquitous credit card or debit card in present use today. Accordingly, in some instances, the display medium may be referred to as a display card, transaction card, access card, etc.

In some examples, an imager includes a validation module to determine whether a particular display medium inserted into the imager is valid for use with the imager.

In some examples, an imager includes tracking capabilities, such as location sensing and evaluation to determine a direction and speed of movement, along with a position and/or orientation of the display medium.

In some examples, an imager conveys a display medium at different velocities along its travel path to perform different operations, such as image capture, machine-readable code reading, image erasing, and/or image writing.

In some examples, an imager supports various components with a frame, which in turn includes a window to enable user viewing of imaging operations, such as erasing and/or writing.

Via at least some of these example arrangements and/or other example arrangements described herein, an imager provides for robust use of re-writable display mediums while enhancing the user's experience.

These examples, and additional examples, are described and illustrated below in association with at least FIGS. 1-21.

Figure 1:
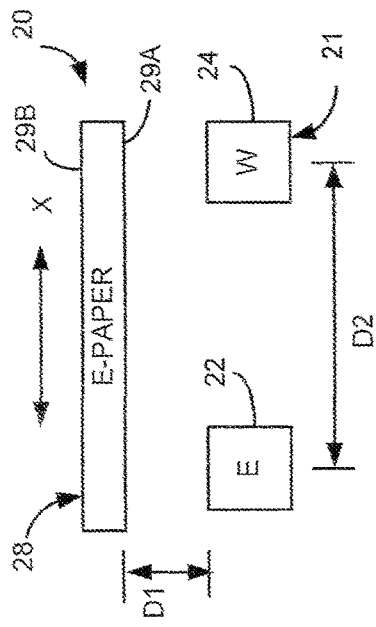
FIG. 1 is a diagram schematically representing an imager, according to one example of the present disclosure.

FIG. 1 is diagram schematically representing an imaging device 20, according to one example of the present disclosure. In some examples, imaging module 21 is positioned to selectively perform imaging functions, such as erasing and/or writing, relative to a rewritable display medium 28. In one aspect, display medium 28 is supported by a conveying structure (shown later in in at least FIG. 5) to be spaced apart by a distance D1 from the imaging module 21. In some examples, the imaging module 21 comprises at least one ion-emitting unit, as later described in association with at least FIG. 4.

As shown in FIG. 1, display medium 28 includes a generally planar member having opposite surfaces 29A, 29B (e.g. faces). In some examples, one of the surfaces 29A, 29B of display medium 28 corresponds to an image-writing surface of the display medium 28 and one of those respective surfaces 29A, 29B corresponds to an image-viewing surface of the display medium 28. In some examples, the image-viewable surface (i.e. image-bearing surface) corresponds to the image-writing surface of the display medium 28 while in some examples, the image-viewable surface (i.e. image-bearing surface) corresponds to a non-image-writable surface of the display medium. Further details of these relationships are described later in association with at least FIGS. 3-4.

In some examples, imaging module 21 includes an erasing unit 22 to erase any prior image from the display medium 28. In some examples, imaging module 21 includes a writing unit 24 to write a new image on the display medium 28. In some examples, imaging module 21 includes both of the erasing unit 22 and the writing unit 24, which may or may not be embodied as a single element.

During operation of the erasing unit 22 and/or writing unit 24, relative movement occurs between the display medium 28 and the imaging module 21. In some examples, such relative movement is achieved via providing a stationary imaging module 21 while moving the display medium 28 relative thereto. Further examples of a display medium 28 and imaging module 21 are provided in association with at least FIG. 3-4 and at least some examples of conveying structures for moving display medium 28 are provided in association with at least FIGS. 5A-18B.

FIG. 2 is a block diagram schematically representing a control portion 35, according to one example of the present disclosure. In some examples, control portion 35 comprises at least some of substantially the same features and attributes as control portion 700, as later described in association with at least FIG. 19. In some examples, control portion 35 forms part of, or operates in association with, control portion 700. In some examples, control portion 35 facilitates control over at least the sequence and timing of operations of imaging module 21, as well as facilitating control over a velocity (e.g. both speed and direction) of relative movement between display medium 38 and imaging module 21.

Figure 3:
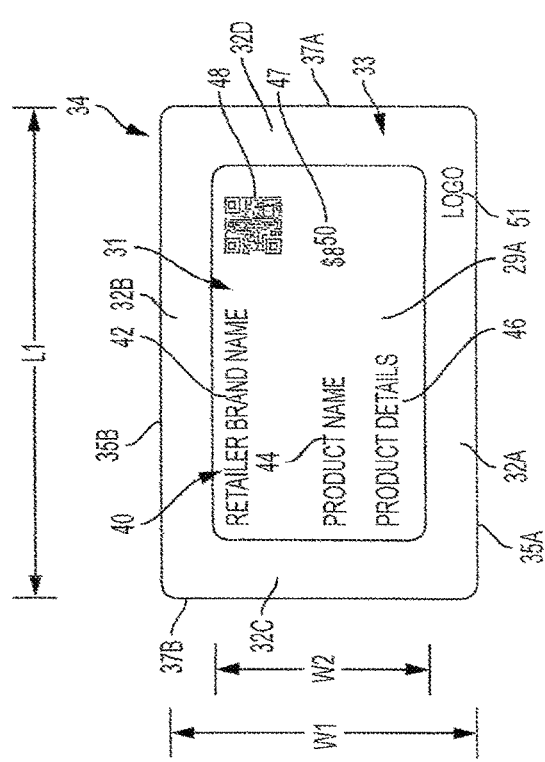
FIG. 3 is a top plan view schematically representing a passive e-paper display medium, according to one example of the present disclosure.

FIG. 3 is a top plan view of a display medium 34 including a passive e-paper display 31, according to an example of the present disclosure. In some examples, display medium 34 comprises at least some of substantially the same features and attributes as display medium 28, as previously described in association with FIG. 1.

As further shown in FIG. 3, in some examples passive e-paper display 31 of display medium 34 bears an image 40 expressed across substantially the entire available viewing surface 29A. In some examples, image 40 includes portions 42 ("Retailer Brand Name"), 44 ("Product Name"), 46 ("Product Details"), and/or 48 (QR Code graphic). Accordingly, image 40 comprises text and/or graphics. It will be understood that in this context, in some examples, graphics also refers to an image, such as specific picture of a person, object, place, etc. Moreover, the particular content of the information in image 40 is not fixed, but is changeable by virtue of the rewritable nature of the e-paper display 31. In one example, a location, shape, size of portions 42, 44, 46, 48 of an image 40 is also not fixed, but is changeable by virtue of the rewritable nature of the e-paper display 31.

As shown in FIG. 3, in some examples, display medium 34 includes a support frame 33 secured to a portion of e-paper display 31. In some examples, frame 33 defines a generally rectangular member, as shown in FIG. 3, which generally matches the size and shape of the periphery of the e-paper display 31. In some examples, the frame 33 is generally co-extensive with an outer portion of the e-paper display 31. In some examples, frame 33 is omitted and e-paper display 31 is free-standing without frame 33. In some examples, frame 33 includes opposite side portions 32A, 32B and opposite end portions 32C, 32D. In some examples, the side portions 32A, 32B of frame 33 further define respective opposite side edges 35A, 35B while end portions 32D, 32C further define respective ends 37A, 37B.

In some examples, frame 33 is made from a polycarbonate or polyvinylchloride (PVC) material. However, in more general terms, frame 33 is made from a resilient or semi-rigid material that is generally non-conductive and that provides mechanical strength and toughness to the e-paper display 31 for protection from bending, compression, abrasion, etc.

In at least some examples of the present disclosure, in addition to the changeable content available via e-paper display 31, fixed content 51 may be located on the frame 33. In some examples, the fixed content 51 may include a logo, name or indicia. In some examples, the fixed content 51 may relate to a retailer or other entity associated with the content writable onto the e-paper display 33. In some examples, the fixed content 51 is imaged via inkjet printheads, digital press, etc. using inks, toners, etc. that would typically be used to print on paper, plastic.

In general terms, display medium 34 includes any visual medium of content consumption. In some examples, display medium 34 includes financial transaction media (e.g. gift cards, prepaid cards, insurance cards, credit cards, etc.) or information transaction media (e.g. shelf tags, boarding passes, shipping labels, package tracking in general. In some examples, display medium 34 includes media used to gain access, establish credentials, and/or implement security.

In at least some examples of the present disclosure, e-paper display 31 is passive in the sense that it is rewritable and holds an image without being connected to an active power source during the writing process and/or after the writing is completed. Accordingly, in some examples, e-paper display 31 omits an on-board power source. In some examples, the e-paper display 31 omits internal circuitry or internal electrode arrays that might otherwise be associated producing specific images in the e-paper display 31. Instead, in some examples, the passive e-paper display 31 relies on a charge-responsive layer that is imageable via an external writing module.

Instead, as further described later, the passive e-paper display 31 is imaged in a non-contact manner in which the e-paper display 31 receives charges (emitted by a ion head) that travel through the air and then form image 40 via a response by charged particles within a layer of the e-paper display 31. After the imaging process is completed, the passive e-paper display 31 retains the image generally indefinitely and without a power supply until image 40 is selectively changed at a later time.

In at least some examples, the passive e-paper display 31 operates consistent with electrophoretic principles. With this in mind, in at least some examples, passive e-paper display 31 includes a charge-responsive layer in which charged color particles switch color when charges are selectively applied a non-contact manner (e.g. airborne migration) by an external module spaced apart from the charge-responsive layer. In some examples, the charged color particles comprise pigment/dye components. In one aspect, this arrangement is implemented via microcapsules containing a dispersion of pigmented particles in a dielectric oil. In some examples, a resin/polymer forms a matrix material that retains the microcapsules in the charge-responsive layer.

In one example, the passive e-paper display 31 further includes a conductive layer which serves as a counter-electrode on one side of the e-paper display 31. In some examples, an additional functional coating is applied to an imaging side of the e-paper 31.

One implementation of an e-paper display 31 according to above-described examples of the present disclosure is later described and illustrated in association with at least FIG. 4.

Figure 4:
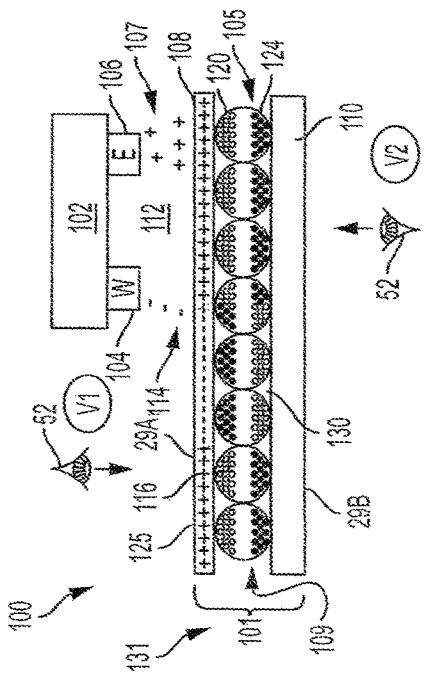
FIG. 4 is a sectional view schematically representing a passive e-paper display juxtaposed with an imaging unit, according to one example of the present disclosure.

FIG. 4 is a sectional view providing a schematic representation of an e-paper display 131 and an associated e-paper writing system 100, according to one example of the present disclosure. In some examples, this e-paper display 131 is implemented via a display medium having at least some of substantially the same features and attributes as display medium 28, 34 previously described in association with at least FIGS. 1 and 3, and in subsequent examples described in association with at least FIGS. 5-21. In some examples, display medium 131 comprises an e-paper structure 101 as shown in FIG. 4.

Meanwhile, writing system 100 includes an imaging module 102 and is provided in FIG. 4 to generally illustrate a response of the e-paper structure 101 (of e-paper display media 131) to an erasing unit 106 and/or writing unit 104. In some examples, imaging module 102 comprises at least some of substantially the same features and attributes as imaging module 21 in FIG. 1.

As shown in FIG. 4, imaging module 102 includes writing unit 104 and erasing unit 106. In some examples, the erasing unit 106 is implemented via an ion-emitting element separate from, and independent of, a different ion-emitting element which implements the writing unit 104. In some examples, the writing unit 104 and erasing unit 106 are implemented via the same ion-emitting element, and by which a polarity of the ions-to-be-emitted can be selectively switched between positive and negative. In some examples, one or both of the writing unit 104 and erasing unit 106 comprises a corona-based charge ejecting device.

In some examples, instead of employing an ion-based emitting unit, erasing unit 106 is implemented via an electrode that comes into close contact with, rolls across, or that is dragged along, the surface 108 in front of a separate writing unit 104. In some examples, the erasing unit can take the form of a floating charge roller, such as but not limited to, such elements disclosed in Gila et al. U.S. Pat. No. 7,050,742 issued on May 23, 2006.

In some examples, e-paper structure 101 has an imaging surface 29A and an opposite non-imaging surface 29B, as in FIGS. 1 and 3.

In general terms, e-paper structure 101 includes a protective layer 108, a charge-responsive layer 109, and a base 110. The protective layer 108 is sometimes referred to as charge-receiving layer 108. The base 110 defines or includes a counter electrode, as further described below, which serves as a ground plane.

In the example shown in FIG. 4, the charge-responsive layer 109 includes a plurality of microcapsules 105 disposed within a matrix material 130 and with each microcapsule 105 encapsulating some charged black particles 124 and some charged white particles 120 dispersed within a dielectric liquid, such as an oil. In one example, as shown in at least FIG. 4, the black particles 124 are positively charged and the white particles 120 are negatively charged.

In some examples, microparticles 120 have a color other than white and microparticles 124 have a color other than black, provided that microparticles 120 have a color different than microparticles 124. In some examples, the color of the particles is originated from pigments, while in some examples the color originates from a dye.

In some examples, charge-responsive layer 109 is formed with microcapsules 105 containing just charged particles 120 (and not containing any charged particles 124) suspended within the microcapsules 105 with an electrically neutral dye having a color different than the color of the particles 120 (e.g. white in one example). In some examples, the liquid solution is dielectric. In some instances, such dielectric solutions include isoparaffinic fluids, such as an Isopar® fluid. Likewise, in some examples, charge-responsive layer 109 is formed with microcapsules 105 containing just charged particles 124 (and not containing any charged particles 120) suspended within the microcapsules 105 with an electrically neutral dye having a color different than the color of the particles 124 (e.g. black in one example).

Via the erasing unit 106, any information stored via the microcapsules 105 is removed prior to writing information via writing unit 104. In the example shown in FIG. 4, as the e-paper structure 101 passes under the imaging module 102, the erasing unit 106 emits positive ions 107, which act to remove negative ions that are attached to the surface 108. The positive charge erasing unit 106 also creates electrostatic forces, which drive positively charged black particles 124 away from the charge receiving layer 108 and which attract negatively charged white particles 120 toward the charge receiving layer 108. By passing the erasing unit 106 over the charge receiving layer 108, the information written to the e-paper structure 101 is erased by positioning the negatively charged white particles 120 near the top of the microcapsules 105 and pushing the positively charged black particles 124 to the bottom of the microcapsules 105.

During writing, electrical contact is made by a ground resource with exposed portions of base 110 (including a counter electrode) to allow biasing of the writing unit 104 while it applies charges to charge receiving layer 108 during the writing process.

Microcapsules 105 exhibit image stability via chemical adhesion between microparticles and/or between the particles and the microcapsule surface. For example, microcapsules 105 can hold text, graphics, and images indefinitely without using electricity, while allowing the text, graphics, or images to be changed later.

The structure, materials, and dimensions of the various layers and components of e-paper structure 101 are chosen for specific design criteria. In one example, the transparent charge receiving layer 108 is composed of a transparent polymer and can have a thickness between 50 µm and 250 µm. In some examples, the transparent charge receiving layer 108 is also composed of a material that holds charges or is porous or semi-porous to charges and/or ions.

In some examples, the diameter of each microcapsule 105 is substantially constant within charge-responsive layer 109 of e-paper structure 101 and, in some examples, the thickness of charge-responsive layer 109 is between about 20 µm and about 100 µm, such as 50 µm. In some examples, base 110 has a thickness between about 20 µm and about 1 mm, or larger depending on how e-paper display 131 is to be used. In some examples, the protective or charge-receiving layer 108 is about 5 microns thick.

In one aspect, base 110 is structured to provide enough conductivity to enable counter charges to flow during printing. As such, in general terms, base 110 comprises a member including at least some conductive properties. In some examples, base 110 comprises a non-conductive material that is impregnated with conductive additive materials, such as carbon nanofibers or other conductive elements. In some examples, base 110 comprises a conductive polymer, such as a urethane material or a carbonite material. In further examples, base 110 is made from a conductive polymer with carbon nanofibers, to provide flexibility with adequate strength.

In some examples, base 110 is primarily comprised of a conductive material, such as an aluminum material and therefore is impregnated or coated with additional conductive materials.

In some examples, whether conductivity is provided via coating, impregnation or other mechanisms, the body of base 110 is formed from a generally electrically insulative, biaxially-oriented polyethylene terephthalate (BOPET), commonly sold under the trade name MYLAR, to provide flexibility and strength in a relatively thin layer.

In some examples, the base 110 is opaque or is transparent, depending on the particular implementation of the e-paper display 131. With further reference to FIG. 4, in some examples, base 110 is opaque, such that image-writing surface 29A of e-paper display 31 also serves as an image-viewing surface, as represented via eye icon 52 and reference V1 in FIG. 4. However, in some examples, base 110 is provided as a transparent element, such that the bottom surface 29B of e-paper display 31 serves as an image-viewing surface of the e-paper display 131 as represented via eye icon 52 and reference V2 in FIG. 4. In some examples, in this latter arrangement, layer 125 is opaque.

In some examples, the base 110 comprises a generally resilient material, exhibiting flexibility and in some implementations, semi-rigid behavior. In some examples, the base 110 comprises a rigid material.

In some examples, the protective, charge receiving layer 108 is made from a semi-conductive polymer having a resistivity of about $10^9$ Ohm-cm or a porous layer that enables ion charges to pass through the layer 108 during erasing and/or writing cycles.

FIG. 4 also shows one example writing operation performed by the writing unit 104 in which the deposition of charges influences the distribution of charged pigments/particles within affected microcapsules 105. In one aspect, the writing unit 104 is designed and operated to selectively eject electrons 114, shown as black bars, toward the charge receiving surface 108, when a region of the e-paper structure 101 located beneath the writing unit 104. As the electrons 114 reach the surface 108, the negatively charged white particles 120 are repelled and driven away from the charge receiving surface 108, while the positively charged black particles 124 are attracted to the negatively charged electrons/ions 114 and driven toward the charge receiving surface 108. Areas of charge-receiving layer 108 will retain a positive charge, and therefore a white appearance in this example. Furthermore, as the writing unit 104 passes over microcapsules 105 while ejecting electrons, the negatively charged white particles 120 are repelled away from the insulating layer and the positively charged black particles 124 are driven toward the charge receiving layer 108.

The e-paper writing system 100, as shown in FIG. 4, is not limited to implementations in which the writing unit 104 discharges electrons and the erasing unit 106 erases information with positive charges. Instead, in some examples, the microcapsules 105 in matrix material 130 of the charge-responsive layer 109 of e-paper structure 101 are composed of negatively charged black particles 124 and positively charged white particles 120. In such examples, the writing unit 104 is designed to produce positive ions for forming a new image, while the erasing unit 106 uses negative charges to erase prior imagery from passive e-paper display 131.

In some examples, charge receiving layer 108 comprises a protective element or coating, which protects the charge-responsive layer 109 (including microcapsules 105) from mechanical damage, pressure and impact, and from collecting tribo charges. It also is designed to reduce increases in dot size due to field screening during charging (the "blooming effect"). In one implementation, the protective charge-receiving layer 108 includes semiconducting characteristics which allow for a controlled decay of the latent charge image, such that the layer 108 gradually dissipates the charges to the ground defined by base 110. The resistivity of the layer 108 is designed to enable fast movement of charges through layer 108. In some instances, the charges will be transferred to ground at least partially defined by base 110 through the layer 109. In particular, the matrix material 131 of charge-responsive layer 109 is selected to provide the desired optical and mechanical characteristics, as well as the desired electrical resistivity.

FIG. 5 is a top plan view schematically representing an imager 210, according to one example of the present disclosure. In some examples, imager 210 includes at least some of substantially the same features and attributes as imager 20 in FIG. 1. As shown in FIG. 5, in some examples, imager 210 includes a pair of conveying structures 220A, 220B laterally spaced apart in the second orientation (represented via directional arrow Y) to be positioned laterally externally to a writable portion of the travel path (T) of display medium 34. It will be understood that the writable portion is generally represented by the location of the writing unit 24, although the dashed box 24 in FIG. 5 is not necessarily to scale. Accordingly, the writable portion can extend a full width (D3) extending between the spaced apart conveying structures 220A, 220B. With this arrangement, the conveying structures 220A, 220B move the display medium 34 along the travel path. Each conveying structure 220A, 220B includes a first end 221A, 221B and an opposite, second end 222A, 222B, respectively. Each conveying structure 220A, 220B has width (W3).

In some examples, various components of imager 210, such as conveying structures 220A, 220B, erasing unit 22, writing unit 24, etc. are supported by a frame 229, which can be single component or multiple components, whether separate or joined together. Frame 229 is represented schematically in FIG. 5 for illustrative clarity and simplicity with it being understood that the size, shape, and/or configuration of frame 229 is not strictly limited to the depiction shown in FIG. 5. Among other features described herein, in some examples, frame 229 at least partially defines a travel path (T) of the display medium 34 and/or supports components (e.g. conveying structures 220A, 220B, entry/exit portions, etc.) which help define the travel path (T).

Given this arrangement, the conveying structures 220A, 220B move rewritable display medium 34 in a first orientation (as represented via directional arrow X) along a travel path (T) and to releasably support the display medium 34 in spaced relation to receive airborne ions from an ion-emitting unit (e.g. erasing unit 22 and/or writing unit 24) for imaging operations, in a manner similar to that previously noted in association with at least FIGS. 1-4. In some examples, the writing unit 24 is spaced apart, and located downstream, from the erasing unit 22.

Accordingly, rewritable passive e-paper display 31 of display medium 34 is positioned between the spaced apart conveying structures 220A, 220B. Some examples of such an arrangement are provided later in association with at least FIGS. 7 and 10B. In addition, the dashed lines forming the box representing erasing unit 22 and the dashed lines forming the box 24 representing writing unit 24 indicate a position vertically below the e-paper display 31 as the display medium 28 along its travel path (T).

Meanwhile, the side portions 32A, 32B of display medium 34, which are laterally external to the e-paper display 31, are aligned for releasable engagement by conveying structure 220A, 220B, respectively. In some examples, the width (W3) of each conveying structure 220A, 220B is the same as or less than a width (W4) of each side portion 32A, 32B of display medium 34. While the conveying structures 220A, 220B can take a wide variety of forms, in some examples, the conveying structures 220A, 220B take the form of belts, rollers, slidable rails, etc. or combinations thereof. One such arrangement is later described in association with at least FIGS. 7 and 15A.

While not shown in FIG. 5, in some examples, the erasing unit 22 is separate from writing unit 22 but otherwise generally co-located with the writing unit 24. In some examples, the erasing unit 22 and the writing unit 24 are not separate units but are implemented as different modalities of one ion-emitting unit, which can be operated in either modality. In such arrangements, the conveying structures 220A, 220B may move the display medium 34 relative to the erasing unit 22 (or an erasing mode) in a first pass and then move the display medium 34 relative to the writing unit 24 (or a writing mode) in a subsequent pass.

FIG. 6 is a top plan view of an imager 250, according to one example of the present disclosure. In some examples, imager 250 includes at least some of substantially the same features and attributes as imager 210 of FIG. 5, except further including conductive elements 261B, 262B.

As further shown in FIG. 7, each conductive element 261B, 262B is positioned to releasably contact the side edge 35B of display medium 34. Because the side edge 35B includes a first conductive portion, such releasable engagement establishes electrical communication between a power supply (e.g. represented by voltage V1) and the first conductive portion, and thereby establishes a ground path for ion-based imaging operations in the manner previously described in association with at least FIG. 4.

While not shown in FIG. 6, it will be understood that in some examples, additional similar conductive elements can be provided to releasably engage the opposite side edge 35A of the display medium 34 to perform similar functions and operations as conductive elements 261B, 262B.

FIG. 7 is a sectional view taken along lines 7-7 of FIG. 6 and schematically representing one example implementation of the conductive elements 261B, 262B and one example implementation of conveying structures 220A, 220B. For instance, the conveying structures 220A, 220B (FIG. 6) may be implemented as conveying structures 280A, 280B. Conveying structure 280A includes a stationary rail 282A and a movable belt 284A while conveying structure 280B includes a stationary rail 282B and a movable belt 284B. Accordingly, belts 284A, 284B releasably, frictionally engage side portions 32A, 32B on one face 29A of display medium 34 while a slidable surface of rails 282A, 282B engage side portions 32A, 32B on an opposite face 29B of display medium 34 such that belts 284A, 284B move display medium 34 relative to the stationary rails 282A, 282B along travel path (T), such as in FIG. 6.

In some examples, at least some of belts 284A, 284B and/or rails 282A, 282B may be replaced with rollers.

Meanwhile, a conductive portion 286 forms at least part of a base electrode (e.g. 110 in FIG. 4) of the e-paper display 31 of display medium 34 and extends to side edge 35B of display medium 34 to be in electrical communication (e.g. electrically coupled) with conductive element 261B. Accordingly, as conveying structures (220A, 220B in FIG. 6; 280A, 280B in FIG. 7) move the display medium 34 along its travel path relative to erasing unit 22, the conductive element 261B (or 262B for writing unit 24) enables establishing a collector potential for the e-paper display 31 to enable imaging operations in a manner consistent the operations described in association with at least FIG. 4. As shown in FIG. 7, the conductive element 261B is spaced laterally apart by a distance Y1 from the conveying structure 280B so that the conveying structure is separate from, and independent of, the conductive element 261B. In some examples, this separation prevents mechanical and/or electrical interaction of the conductive element 261B, 262B relative to the conveying structures (220A, 220B in FIG. 6; 280A, 280B in FIG. 7).

As shown in FIGS. 6-7, side edge 35B is generally perpendicular to the faces 29A, 29B of the display medium 34 and the conductive element 261B is separate from, and independent of, the conveying structure 220B. Meanwhile, each conveying structure releasably supports the display medium 34 via releasable engagement of opposite faces 29A, 29B of the display medium 34.

As shown in FIG. 6. in some examples, one conductive element 261B is located at generally the same position along the travel path as the erasing unit 22 and the other conductive element 262B is located at generally the same position along the travel path as the writing unit 24 such that conductive element 261B is spaced apart from, and independent of, conductive element 262B. Accordingly, in some examples, conductive element 261B is spaced apart from conductive element 262B along the travel path (directional arrow X) by generally the same distance (D2) by which erasing unit 22 is spaced apart from writing unit 24.

In some examples, each conductive element 261B, 262B is supplied with its own voltage V1, V2, respectively such that voltage V1 is separate from, and independent of, voltage V2. In some examples, voltage V1 can be selected to equal voltage V2 or can be selected to be different from voltage V2. In some examples, voltage V1 and voltage V2 are common, i.e. not separate from, and independent of, each other.

In some examples, each one of the conductive elements 261B, 262B is implemented as a plurality of conductive elements 291A, 291B, as shown in FIG. 8. In one implementation, the plural conductive elements 291A, 291B are spaced apart by a distance X1. In some examples, this arrangement facilitates operation of a validation arrangement, as further described later in association with at least FIGS. 13-14.

In some examples, conductive elements 261B, 262B (FIGS. 6-7) do not contribute to moving display medium 34. However, in some examples, at least one of conductive elements 261B, 262B takes a form (e.g. a driven roller) which contributes to moving display medium 34 in cooperation with conveying structures 220A, 220B.

In some examples, instead of the arrangement shown in FIGS. 6-7, the conductive elements 261B, 262B releasably engage a conductive portion on one of the faces 29A, 29B of the display medium 34, while the conveying structures 220A, 220B (or other conveying structures) releasably engage the side edges 35A, 35B of the display medium 34 to move the display medium 34.

In some examples, at least one of the conductive elements 261B, 262B forms part of a validation arrangement 510 and/or validation module 550 as further described later in association with at least FIGS. 13-14.

In some examples, each conductive element 261B, 262B may comprise a brush 296 or a roller 297, as shown in FIG. 9. However, either conductive element 261B, 262B can take other forms suited to provide electrically conductive, releasable coupling relative to a conductive portion (e.g. a side edge) of the display medium 34.

FIG. 10A is a top plan view schematically representing an imager 350, according to one example of the present disclosure. In some examples, imager 350 comprises at least some of substantially the same features and attributes as any one of the imagers and/or imager components, as described in with FIGS. 1-9 and FIGS. 10B-21.

As shown in FIG. 10A, in some examples imager 350 includes at least substantially the same features and attributes as imager 210 as described in association with at least FIG. 5, except further including a machine-readable-code (MCR) reader 352. In some examples, the machine-readable-code reader 352 is located upstream from the erasing unit 22 by a distance D4, which may or may not be the same as distance D2.

In general terms, distances D2 and D4 are selected in accordance with a speed of conveyance of display medium 34 so that the distances D2 and D4 will correspond to a desired elapsed time period during movement of the display medium 34 between the machine-readable-code reader 352, erasing unit 22, and writing unit 24. The elapsed time period, in turn, depends on an amount of time appropriate for each of the machine-readable-code reader 352, erasing unit 22, and writing unit 24 to perform their respective functions relative to the components of the display medium 34.

With this in mind, in some examples, imager 350 may be operated according to different velocity zones 360, 362, 364 as further shown in FIG. 10A. In particular, in some examples, the control portion (35 in FIG. 2, 700 in FIG. 19) causes the conveying structures 220A, 220B to move the display medium 34 at a first velocity within zone 360 adjacent the machine-readable-coder reader 352, at a second velocity within zone 362 adjacent the erasing unit 22, and a third velocity within zone 364 adjacent the writing unit 24. Each respective velocity is selectably different according to the previously described parameters of distance (D2, D4) and time in view of the operations performed by the reader 352, erasing unit 22, and/or writing unit 24. Accordingly, the size of the respective velocity zones 360, 362, 364 relative to each other may be selected or adjusted depending on the speed of the conveyance of display medium 34 and/or distances (e.g. D2, D4) among the reader 352, erasing unit 22, and writing unit 24.

In some examples, at least the first velocity of display medium 34 in zone 360 is different than the second and third velocities in zones 362, 364. In some examples, the velocity in each zone 360, 362, and 364 is different.

In some examples, the velocity of display medium 34 in zone 364 is different than at least the second velocity in zone 362. In some examples, imager 350 operates according to more than three different velocity zones 360, 362, 364. In some examples, imager 350 operates with less than three different velocity zones, such as if the second and third velocity zones were combined or if the first and second velocity zones were combined.

In some examples, with regard to the different velocities in zones 360, 362, 364, it will be understood that a control portion 35 may cause a conveyance of the display medium 34 to be reversed to travel in an opposite direction. Such reversals may occur to eject a display medium 34 via entry portion 410 or may occur to perform some imaging-related functions.

FIG. 10B is a sectional side view as taken along lines 10B-10B of FIG. 10A and schematically represents an imager 370, according to one example of the present disclosure. In some examples, imager 370 includes at least some of substantially the same features and attributes as imager 350 in FIG. 10A. As shown in FIG. 10B, in imager 370, writing unit 24 is spaced apart from, and vertically below (as represented via directional arrow Z), the conveying structures 220A (and 220B) such that a display medium 34 conveyed via structures 220A, 220B would be spaced apart by a distance D1 from the writing unit 24. Meanwhile, via the conveying structure 220A, 220B, the erasing unit 22 is spaced apart from display medium 34 by a distance D7, which is greater than distance D1 in some examples. Via the conveying structure 220A, 220B, the reader 352 is spaced apart from display medium 34 by a distance D6, which is greater than distance D7 and/or D1, in some examples.

In some examples, the erasing unit 22 is spaced apart by a distance (D7), which is greater than distance D1 because erasing the e-paper display 31 of display medium 34 may not involve a degree of precision associated with forming an image via writing unit 24. Moreover, in some examples, the greater distance (D7) of separation enables more flexibility in the arrangement of the components of the imager (350 in FIG. 10A, 370 in FIG. 10B). In some examples, the machine-readable-code reader 352 is spaced apart by a distance D6 greater than distance D7 or distance D1 to enable sufficient space for the arrangement of the components of the reader 352, such as multiple optical components associated with optical machine-readable-code readers.

However, in some examples, such as when machine-readable-code reader 352 embodies a magnetic-based reader, the distance D6 may be less than distance D7 and distance D1. In some such examples, distance D6 can be zero because at least a portion of the magnetic-based reader may involve direct contact with a portion of the display medium 34, such as when display medium 34 includes a magnetic stripe-based storage medium. In some examples, the magnetic stripe-based storage medium does not form part of the passive e-paper display 31 but is located on the frame 33 of display medium 34.

In some examples, such an when reader 352 comprises an optical machine-readable-code reader 352, reader 352 reads a machine-readable-code comprising a portion the image 40 on e-paper display 31 (FIG. 3). In some examples, an optical machine-readable-code reader 352 reads a machine-readable-code located on the frame 33 of the display medium 34.

FIG. 11 is a top plan view schematically representing an imager 400, according to one example of the present disclosure. In some examples, imager 400 comprises at least some of substantially the same features and attributes as any one of the imagers and/or imager components, as described in with FIGS. 1-10B and FIGS. 12-21.

In some examples, as shown in FIG. 11, imager 400 includes an entry portion 410 and an exit portion 412. The entry portion 410 is located adjacent to and coupled relative to the ends 222A, 222B of conveying structures 220A, 220B while exit portion 412 is located adjacent to and coupled relative to the ends 221A, 221B of conveying structures 220A, 220B. The entry portion 410 acts to receive and guide display medium 34 into releasable engagement with conveying structures 220A, 220B. Meanwhile, exit portion 412 acts to guide and transition the display medium 34 out of releasable engagement with conveying structures 220A, 220B.

As shown in FIG. 11, in some examples, imager 400 comprises at least some of substantially the same features and attributes as imager 350 in FIG. 10A, except further including an array 430 of location sensors 432, 434, 436. The location sensors 432, 434, 436 are spaced apart in series along the travel path with each location sensor 432, 434, 436 available to identify a presence or absence of the display medium 34 at each respective location.

In some examples, the location sensors 432 are spaced apart from each other by a distance D5. In some examples, there is a uniform spacing between all of the location sensors 432, 434, 436. However, in some examples, non-uniform spacing exists between at least some of the location sensors 432, 434, 436.

FIG. 11 illustrates location sensors 432, 434, 436 aligned in single line. However, it will be understood that in some examples at least some sensors, such as sensor 437, may be placed in a different lateral position along the second orientation (directional arrow Y) transverse to the first orientation (directional arrow X) of the travel path (T). In some examples, at least some sensors, such as sensor 439, may be placed in parallel to one of the other sensors 432 or 434 or 436, such that both sensor 439 and another sensor (e.g. 432) are aligned in a single plane parallel to the transverse orientation (directional arrow Y).

In some examples, the various location sensors 432, 434, 436, 437, 439 detect the presence or absence of display medium 34 at the location of each respective sensor 432-439.

In some examples, at least some of the sensors 432-439 include contact-based sensors while in some examples, at least some of the sensors 432-439 comprise contact-less sensors.

In some examples, entry portion 410 includes at least some sensors (e.g. 434) to detect the presence or absence of display medium 34, with such detection resulting in a signal, which may trigger additional activities and functions of imager 400. In some examples, such detection triggers timing operations per control portion (35 in FIG. 2; 700 in FIG. 19), which drive the additional activities and functions of imager 400. In some examples, exit portion 412 includes at least some sensors (e.g. 436) to provide analogous functions as described for sensors 434.

In some examples, the locations associated with each of the location sensors 432-439 are employed in association with a validation arrangement, as further described later in association with at least FIGS. 13-14.

FIG. 12 is a block diagram schematically representing a tracker module 530, according to one example of the present disclosure. In some examples, tracker module 530 is operable in association with the array 430 of location sensors 432-439 in FIG. 11. In some examples, tracker module 530 is operable in association with at least some components and apparti other than array 430 of sensors 432-439.

In some examples, tracker module 530 generally tracks interaction of display medium 34 with an imager according to various physical parameters, such as a direction parameter 532 regarding a travel direction of the display medium 34, a speed parameter 534 regarding a travel speed of the display medium 34, a position parameter 536 regarding a relative or absolute position of the display medium 34 along the travel path, and/or an orientation parameter 538 regarding an orientation of some physical aspect (e.g. which face 29A, 29B) of the display medium 34.

In some examples, speed parameter 534, direction parameter 536, and/or position parameter 538 track their respective information based, at least partially, on the location sensors 432-439 which detect the presence or absence of the display medium 34 at the location of the respective sensor. In some examples, speed parameter 534 and/or direction parameter 536 track their respective information based, at least partially, on an encoder associated with examples of the conveying structures 220A, 220B, which employ a driven belt to cause movement of the display medium 34 along its travel path.

In some examples, orientation parameter 538 tracks its information via machine-readable-code reader 532 (FIGS. 10A, 11), which may detect the presence or absence of a machine-readable-code (e.g. 48 in FIG. 3) on display medium 34, and therefore provide guidance on whether the display medium 34 is properly oriented relative to the components of an imager (e.g. 350 in FIG. 10A), such as which face 29A, 29B of display medium 34 is oriented toward the machine-readable-code reader 352, erasing unit 22, and writing unit 24.

In some examples, information tracked via tracker module 530 is employed in association with a validation arrangement 510 as described in association with at least FIGS. 13-14.

FIG. 13 is a top plan view schematically representing an imager 500, according to one example of the present disclosure. In some examples, imager 500 comprises at least some of substantially the same features and attributes as imager 400 in FIG. 11, except further including a validation arrangement 510 associated with a validation zone 511. In some examples, the validation arrangement 510 employs various components of the imagers and imager components, as described in association with at least FIGS. 1-12 and 14-21. As shown in FIG. 13, validation arrangement 510 determines a validity of a display medium 34 within zone 511 at least some point in time prior to a display medium 34 passing by writing unit 24.

In some examples, a validation arrangement 510 permits execution of target-content imaging operations upon a determination that the display medium 34 is valid and prevents execution of target-content imaging operations upon a determination that display medium is invalid. Stated differently, validation arrangement 510 includes or provides the tools to determine whether a particular display medium 34 is valid or invalid, which then leads to permitting execution or preventing execution of target-content imaging operations on the particular display medium 34. In some examples, the target-content imaging operations may be performed via at least erasing unit 22 and/or writing unit 24.

In some examples, the validation arrangement 510 includes or employs other features of imager 500 to make the determination regarding validity. In some instances, the determination is made at least partially based on conductive elements 261B, 262B in FIGS. 6-9, as more fully described below in association with electrical parameter 556 in FIG. 14.

In some examples, in the event that validation arrangement 510 determines that display medium 34 is not valid for use with the imager 500, the imager 500 may still perform some non-target-content imaging operations on display medium 34, depending on the reason(s) for the determination of invalidity of a particular display medium 34. For instance, if the particular display medium 34 is electrically and physically compatible with the imager 500, but invalid for other reasons, such non-target-content operations may include erasing any image from the display medium 34 without performing any other functions. In some examples, such non-target-content operations may include erasing any image from the display medium 34 and then writing an image including a message (e.g., "INVALID") onto the e-paper display 31. In some examples, such non-target-content operations may include not erasing any images on the e-paper display 31 and then writing additional imagery such as a message (e.g. "INVALID") over prior images. In some examples, such messages are referred to as non-target-content because they include content other than the types of content intended to be displayed on the display medium 34.

In some examples, upon a determination via the validation arrangement 510 that the display medium 34 is invalid, in at least some instances the imager 500 ejects the display medium 34 without performing any imaging operations. In some examples, such ejection may occur via reversing movement of the display medium 34 such that the display medium 34 exits imager 500 via the entry portion 410. In some examples, such ejection may occur via continuing movement of display medium 34 through the imager 500 but passing by erasing unit 22 and writing unit 24 without any imaging operations being performed. However, some physical parameters (e.g. bent card, card thickness, etc.) may preclude the display medium 34 from being permitted its ejection via forward movement through the imager 500, in which case the imager 500 directs ejection via ejection by reversing the direction of the movement of the card. At least some examples of such physical situations are further described later in association with at least FIGS. 15A-15B.

In some examples, the validation arrangement 510 performs a determination of validity of display medium 34 in association with validation module 550, as shown in FIG. 14. In some examples, a determination regarding validity includes issues such as determining whether a particular display medium inserted into an imager is the proper type of display medium and whether the particular display medium has been inserted in the proper manner (e.g. right side up, proper end inserted first, etc.). Assuming these issues are resolved satisfactorily, additional issues include determining whether the particular display medium 34 has a type of stored content expected by the imager, such as might be determined by optically reading a bar code and/or magnetically reading a magnetic stripe on the display medium 34. In some examples, a determination of validity of the display medium 34 is not an issue of whether a user has proper credentials submitted via a user interface (e.g. 730 in FIG. 20).

In some examples, validation module 550 determines a validity of a display medium 34 for use in imager 500 according to a machine-readable-code parameter 552, a physical parameter 554, an electrical parameter 556, and/or a visual parameter 558. In one aspect, these different validation modalities (552, 554, 556, 558) are not strictly dependent on their particular location in or on imager 500. In another aspect, these different modalities may be used separately or in various combinations to determine a validity of the display medium 34 for imaging operations.

In some instances, such validity refers to whether the display medium 34 can be processed at all based on its physical and/or electrical characteristics. In some instances, a display medium 34 has the proper physical and electrical characteristics, but such validity refers to whether the display medium 34 has been inserted with a proper orientation. In some instances, a display medium 34 has the proper physical and/or electrical characteristics but such validity refers to whether display medium 34 has the proper content in a storage medium (e.g. bar code or magnetic code).

In some examples, the validation module 550 includes and employs a machine-readable-code reader to read machine-readable-code (e.g. 48 in FIG. 3) on the display medium 34. As previously noted in association with the validation arrangement 510 in FIG. 10A, the machine-readable-code (MCR) reader 352 can employ an optical modality, such as a single dimensional bar code reader or two-dimensional bar code (e.g. quick response, QR code) reader. However, in some examples, machine-readable-code (MRC) reader 352 can employ a magnetic modality, such as a magnetic stripe reader relative to a magnetic stripe on the display medium 34.

In some examples, a machine-readable-code reader 352 determines validity according to a presence or an absence of the machine-readable-code on the display medium 34, according to a location of the machine-readable-code on the display medium 34, and/or according to a content of the machine-readable-code relative to an external database in communication with the machine-readable-code reader (or imager as a whole). For instance, if a display medium 34 is inserted in an "upside-down" manner, the machine-readable-code (MCR) reader 352 may detect an absence of the machine-readable-code on the display medium 34 or that the machine-readable-code is in the wrong location on the display medium 34. However, if the display medium 34 is inserted "right-side-up" (and first end "in"), some display mediums 34 could have a machine-readable-code in a location other than expected by the imager because the machine-readable-code does not properly align with the location and/or operable range of the machine-readable-code reader 352. Such display mediums 34 would be determined to be invalid relative to the particular imager.

Assuming that a display medium 34 is properly inserted right-side-up and the machine-readable-code is located to be capturable by the reader 352, then the imager also checks the machine-readable-code for certain types of content handled by that imager in association with the particular institution (e.g., user, employer, government, business, facility, etc.) employing the imager. Without a proper match, the display medium 34 is rejected for invalidity.

However, it will be understood that in some examples the machine-readable-code (MCR) reader 352 described in association with FIG. 11 is separate from, and independent of, validation arrangement 510 shown in FIG. 13 and/or validation module 550 in FIG. 14. In other words, in some examples, the reader 352 does not function as part of the validation arrangement 510 and/or validation module 550.

In some examples, the validation module 550 includes and employs a physical parameter 554 to determine validity of the display medium 34 for use with the imager. In some examples, physical parameter 554 evaluates a width and/or length of the display medium 34 via operation of multiple location sensors 432, 434, 436, 437, 439.

In some examples, the physical parameter 554 evaluates whether the display medium 34 is generally planar (e.g. flat) and/or evaluates its thickness. In some examples, such physical characteristics are evaluated according to physical structures within the imager, such as further described later in association with FIGS. 15A-15B. In one sense, these physical structures act to "filter" improperly sized/shaped display mediums 34 to prevent their passage by at least writing unit 24, which can be located in close proximity to an imageable surface of the e-paper display 31 of the display medium 34.

In some examples, as further shown in FIG. 14, validation module 550 determines a validity of the display medium 34 (for use with a particular imager) according to an electrical parameter 556. For instance, as previously described in association with at least FIGS. 4 and 6-9, in some examples, a conductive element 261B, 262B may be electrically, releasably coupled relative to a conductive side edge 35B (or 32A) of the display medium 34 to enable imaging operations on passive e-paper display 31. Accordingly, a validity of a particular display medium 34 can be determined via these components. For instance, if a particular display medium 34 lacked a conductive portion on its side edge 35B or if the display medium 34 were inserted upside down so that side edge 35A (not having a conductive portion) were exposed to conductive element 261B, 262B, then a control portion 35 (and supporting circuitry) associated with the conductive element 261B, 262B would detect that an electrical pathway could not be established with the side edge of display medium 34. Accordingly, imager 500 would not authorize imaging operations on such a display medium 34.

It will be noted that in some instances, a display medium 34 can have exposed conductive portions on both opposite side edges 32A, 32B.

In some examples, electrical parameter 556 utilizes more complex arrangements of conductive elements, such as shown in FIG. 8, in which a conductive element 261B and/or 262B (FIGS. 6-7) comprises at least two separate conductive elements 291B, 292B spaced apart along the travel path. With this arrangement, a control portion (35 in FIG. 2) of the imager (in association with supporting circuitry) can evaluate for the presence of conductivity and/or a degree of conductivity on a side edge 35B (or 32A) of a display medium 34.

Figure 15A:
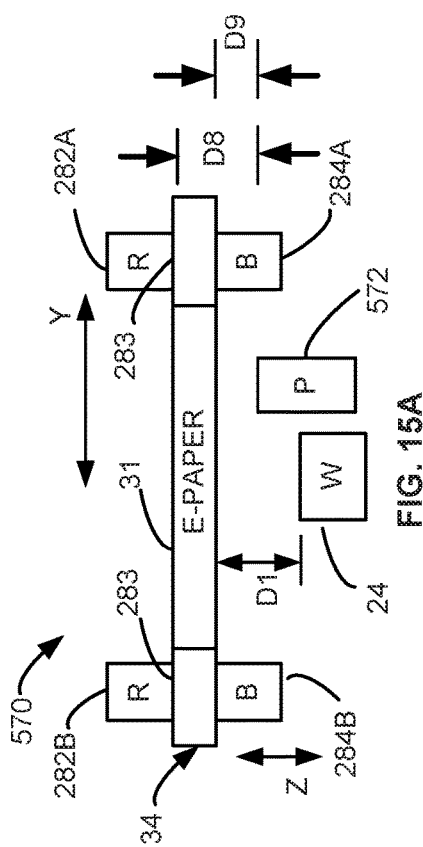
FIG. 15A is an end view schematically representing a portion of an imager including a physical element in a validation arrangement, according to one example of the present disclosure.

FIG. 15A is a sectional view schematically representing an imager 570 including some physical structures to filter display mediums, according to one example of the present disclosure. In some examples, imager 570 comprises at least some of substantially the same features and attributes as the imagers described in association with at least FIGS. 1-14 and 17-21, while further including at least one physical structure 572 positioned in the travel path (T). In some examples, physical structure 572 is located upstream from an ion-emitting unit, such as writing unit 24, to prevent movement of certain display mediums 34 past the writing unit 24. In particular, physical structure 572 is sized and shaped to be spaced apart by a distance D8 from a slidable contact surface 283 of rails 282A, 282B (and against which display medium 34 is releasably engaged while display medium 34 is conveyed along the travel path). As shown in FIG. 15A, distance D8 is selected so that physical structure 572 is spaced apart from a face (e.g. 29A, 29B in FIG. 4) display medium 34 by a distance D9, such that at least a minimum clearance (difference between D9 and D1) can be maintained between a face (e.g. 29A, 29B in FIG. 4) of a display medium 34 and the writing unit 24. In some instances, this clearance may be referred to as a gap. In some instances, the physical structure 572 may be referred to as a protrusion, such as but not limited to a protrusion extending from a support member or a frame portion. In some examples, distance D9 is one-half the distance D1, with distance D1 corresponding to a nominal clearance between a display medium 34 and writing unit 24.

The presence of physical structure 572 prevents a display medium 34 having a larger thickness or a bent/warped profile from contacting and potentially damaging writing unit 24. In the event that conveyance of display medium 34 is blocked by physical structure 572, then some of the location sensors (e.g. 432 in FIGS. 11, 13) provide an indication that the display medium 34 has stopped moving along the travel path or that such conveyance has slowed, which in turn triggers the imager (via control portion 35 in FIG. 2) to reverse the conveyance direction of the display medium 34 for ejection through entry portion 410.

Figure 15B:
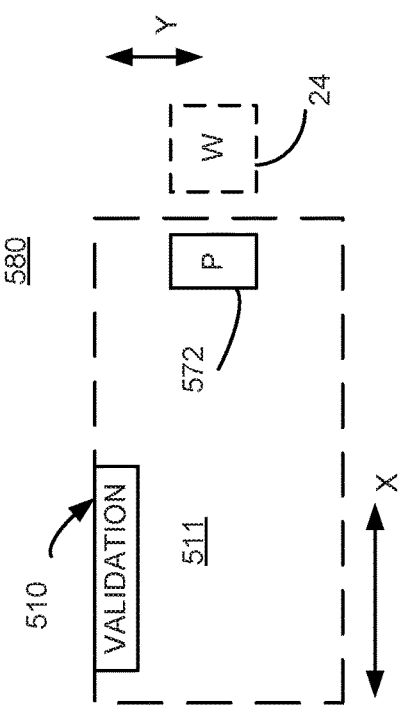
FIG. 15B is a top plan view schematically representing an imager including a physical element in a validation arrangement, according to one example of the present disclosure.

As further shown in the top plan view of FIG. 15B, in some examples the physical structure 572 forms part of validation arrangement 510 and is within validation zone 511. As shown in FIG. 15B, in some examples physical structure 572 is located just prior to writing unit 24 although in some examples, physical structure 572 can be located further upstream relative to writing unit 24. For instance, in some examples physical structure 572 can be located in entry portion 410 (FIGS. 11, 13) and/or just prior to erasing unit 22. In some examples, more than one physical structure 572 is located along the travel path prior to writing unit 22 with such multiple physical structures 572 spaced apart in series.

In some examples, such multiple physical structures 572 are spaced apart laterally in the second orientation (directional arrow Y) transverse to the travel path (T).

In some examples, different physical structures 572 have different spacings (D8) relative to the slidable contact surface 283 of rails 282A, 282B.

Figure 16:
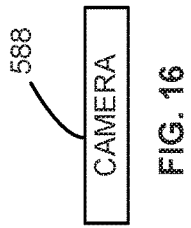
FIG. 16 is a block diagram schematically representing a camera, according to one example of the present disclosure.
Figure 17:
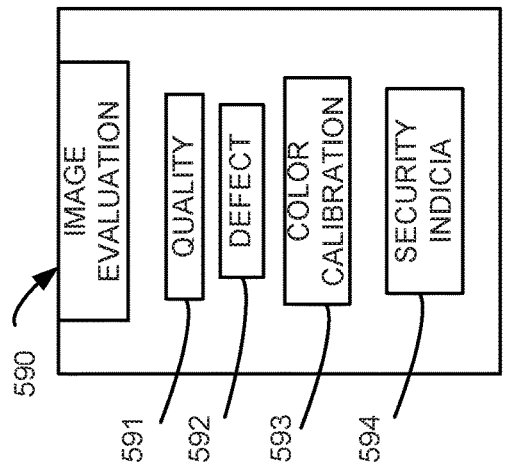
FIG. 17 is a block diagram schematically representing an image evaluation module, according to one example of the present disclosure.

FIG. 16 is block diagram of a camera 588 and FIG. 17 is block diagram schematically representing an image evaluation module 590, according to one example of the present disclosure. In some examples, camera 588 and image evaluation module 590 are incorporated into an imager, such as one of the imagers described herein. In some examples, camera 588 and/or image evaluation module 590 form part of validation arrangement 510, and as such may be located in validation zone 511 (e.g. FIGS. 13,15B).

In some examples, camera 588 is aligned with the travel path (T) to capture an image of the e-paper display 31 of display medium 34. In some examples, camera 588 is located upstream along travel path (T) from the erasing unit 22 and/or writing unit 24.

In some examples in which machine-readable-code (MCR) reader 352 (e.g. FIGS. 10A, 11) comprises an optical reader, camera 588 can also function as at least part of reader 352 or reader 352 may function as part of camera 588. Accordingly, in such instances, camera 588 can be co-located with reader 352 along travel path (T).

In some examples, the image evaluation module 590 evaluates the captured image according to various parameters, such as an image quality parameter 591, defect parameter 592, color calibration parameter 593, and/or security indicia 594, as shown in FIG. 17. In some instances, such parameters are used to calibrate an imager while in some instances, such parameters are used to evaluate a particular display medium for other purposes, such security or suitability to receive an image.

In some examples, image quality parameter 591 relates to general image quality, such as clarity and resolution of images formed on e-paper display 31 of display medium 34. In some examples, defect parameter 592 identifies defects in the e-paper display 31 that may result in poor image quality or inability of the e-paper display 31 to function properly. In some examples, identifiable defects include artifacts in an image (on e-paper display 31) that are indicative of a defect in some imaging components related to conveyance, erasing, writing, etc.

In some examples, such as when an e-paper display 31 employs multiple colors of switchable microparticles to form an image, the color calibration parameter 593 tracks color calibration factors associated with operation of erasing unit 22 and/or writing unit 24.

In some examples, the security indicia parameter 594 evaluates a captured image regarding a presence or absence of security indicia in the image on the e-paper display 31. The security indicia may indicate whether the display medium 34 was previously used in an authorized manner and/or is authorized for use with a particular imager. In some examples, such security indicia can also be used in association with validation arrangement 510 to determine whether a display medium 34 is valid for imaging.

Figure 18B:
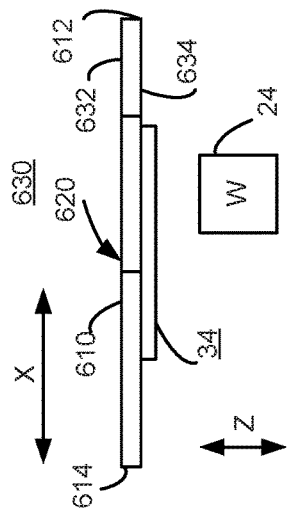
FIG. 18B is a side sectional view schematically representing an imager having a frame including a window, according to one example of the present disclosure.
Figure 18A:
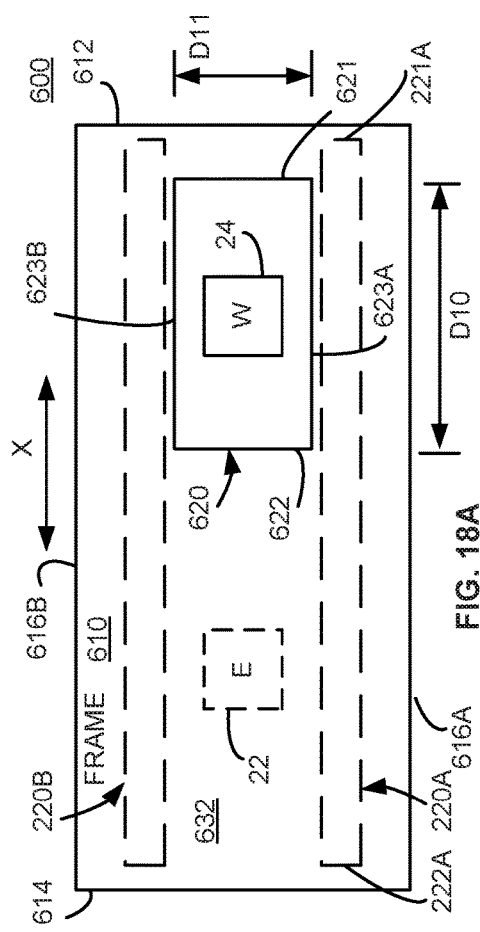
FIG. 18A is a top plan view schematically representing an imager having a frame including a window, according to one example of the present disclosure.

FIG. 18A is top plan view schematically representing an imager 600, according to one example of the present disclosure. In some examples, imager 600 comprises at least some of substantially the same features and attributes as the imagers described in association with at least FIGS. 1-17, while further including a window 620 (e.g. an observation portion) formed in a frame 610. In general terms, side edges 623A, 623B of window 620 are positioned laterally external to the imaging track 632 of the travel path at least in the region of the writing unit 24 to enable a user to view the passive e-paper display 31 during writing operations.

In some examples, frame 610 includes opposite ends 612, 614 and opposite side edges 616A, 616B with frame 610 having a width greater than width (D11) between conveying structures 220A, 220B and having a length greater than a length (D10) of conveying structures 220A, 220B along travel path (T).

As further shown in FIG. 18B, window 620 of frame 610 is spaced apart vertically above the writing unit 24 with display medium 34 being conveyed underneath (vertically below) the frame 610.

In some examples, window 620 defines a void of clear space. In some examples, window 620 includes a transparent material.

As shown in FIG. 18A, in some examples window 620 has a length (D10) and a width (D11) to provide visibility in a region surrounding writing unit 22 to enable viewing of image formation on display medium 34. In some examples, window 620 is not positioned over writing unit 24, but is positioned to provide such visibility of a region over erasing unit 22. In some examples, window 620 is sized and positioned to provide visibility over regions surrounding both erasing unit 22 and writing unit 24. In some examples, separate windows 620 are provided for erasing unit 22 and writing unit 24 such that the separate windows are spaced apart from each other along the travel path (T).

Figure 19:
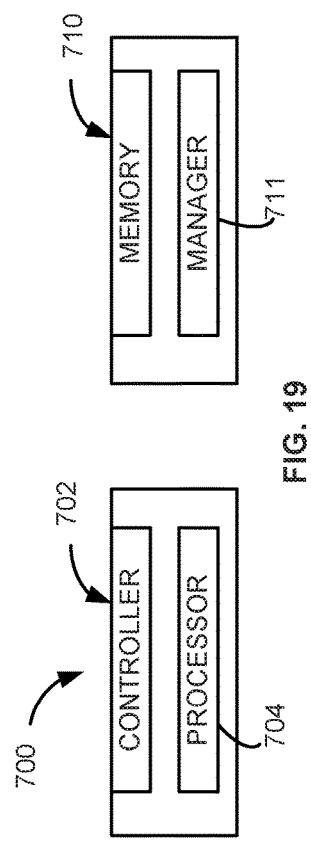
FIG. 19 is a block diagram schematically representing a control portion, according to one example of the present disclosure.

FIG. 19 is a block diagram schematically representing a control portion 700, according to one example of the present disclosure. In some examples, control portion 700 includes a controller 702 and a memory 710. In some examples, control portion 700 provides one example implementation of control portion 35 in FIG. 2.

Controller 702 of control portion 700 can comprise at least one processor 704 and associated memories that are in communication with memory 710 to generate control signals, and/or provide storage, to direct operation of at least some components of the systems, components, and modules described throughout the present disclosure. In some examples, these generated control signals include, but are not limited to, employing manager 711 stored in memory 710 to manage imaging operations relative to a rewritable display medium in the manner described in at least some examples of the present disclosure.

In response to or based upon commands received via a user interface (e.g. user interface 730 in FIG. 20) and/or via machine readable instructions, controller 702 generates control signals to implement at least conveyance, validity determination, imaging, and/or other imaging-related functions in accordance with at least some examples of the present disclosure. In some examples, controller 702 is embodied in a general purpose computer while in other examples, controller 702 is embodied in the imaging devices described herein generally or incorporated into or associated with at least some of the components described throughout the present disclosure, such as control portion 35 (FIG. 2).

For purposes of this application, in reference to the controller 702, the term "processor" shall mean a presently developed or future developed processor (or processing resources) that executes sequences of machine readable instructions contained in a memory. In some examples, execution of the sequences of machine readable instructions, such as those provided via memory 710 of control portion 700 cause the processor to perform actions, such as operating controller 702 to implement at least conveyance, validity determination, imaging, and/or other imaging-related functions, as generally described in (or consistent with) at least some examples of the present disclosure. The machine readable instructions may be loaded in a random access memory (RAM) for execution by the processor from their stored location in a read only memory (ROM), a mass storage device, or some other persistent storage, as represented by memory 710. In some examples, memory 710 comprises a volatile memory. In some examples, memory 710 comprises a non-volatile memory. In some examples, memory 710 comprises a computer readable tangible medium providing non-transitory storage of the machine readable instructions executable by a process of controller 702. In other examples, hard wired circuitry may be used in place of or in combination with machine readable instructions to implement the functions described. For example, controller 702 may be embodied as part of at least one application-specific integrated circuit (ASIC). In at least some examples, the controller 702 is not limited to any specific combination of hardware circuitry and machine readable instructions, nor limited to any particular source for the machine readable instructions executed by the controller 702.

Figure 20:
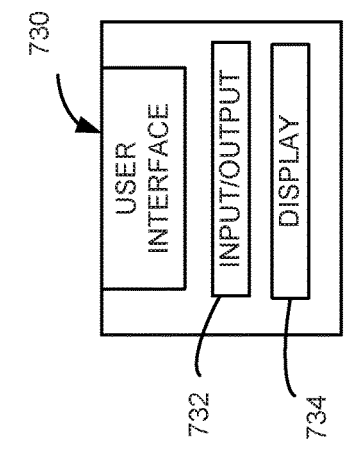
FIG. 20 is a block diagram schematically representing a user interface, according to one example of the present disclosure.

FIG. 20 is a block diagram of a user interface 730, according to one example of the present disclosure. In some examples, user interface 730 provides for the simultaneous display, activation, and/or operation of at least some of the various components, modules, functions, parameters, features, and attributes of control portion 700 and/or the various aspects of operations, as described throughout the present disclosure. In some examples, at least some portions or aspects of the user interface 730 are provided via a graphical user interface (GUI). In some examples, user interface 730 includes an input/output 732 and a display 734, which may or may not be combined in a single element, such as a touch screen display.

Figure 21:
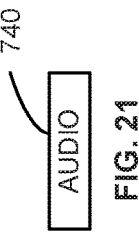
FIG. 21 is a block diagram schematically representing an audio function, according to one example of the present disclosure.

In some examples, input/output 732 includes an audio function 740, as shown in FIG. 21, to emit sounds associated with various functions of the imager. In some examples, audio function 740 may emit a tone or verbal expression before, during, and/or after execution of a particular function of the imager. For instance, audio function 740 may emit a tone or verbal expression upon the imager initiating, performing, and/or completing a function, such as erasure of a display medium and/or writing a new image onto a display medium.

In at least some examples, among other features and functions, various components of an imager provide for handling a display medium to facilitate quality imaging while preventing improper use of the imager and/or use of improper display mediums.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An imager comprising:
   an ion-emitting unit;
   a conveying structure to move a passive e-paper display medium in a first orientation along a travel path and to releasably support the display medium in spaced relation to receive airborne ions from the ion-emitting unit for imaging operations;
   a validation arrangement to permit target-content imaging operations via the ion-emitting unit upon a determination the display medium is valid and to prevent target-content imaging operations upon a determination that the display medium is invalid, and
   a machine-readable-code reader;
   wherein the ion-emitting unit comprises:
      an erasing unit spaced apart, and located downstream, from the machine-readable-code reader; and
      a writing unit spaced apart, and located downstream, from the erasing unit.

2. The imager of claim 1, wherein the conveying structure includes a pair of conveying units laterally spaced apart in the second orientation to be positioned laterally externally to a writable portion of the travel path, and comprising a frame supporting the pair of conveying units and including a window be positioned laterally external to the writable portion of the travel path at least in the region of the writing unit to enable viewing of the rewritable portion of the passive e-paper display medium during at least some imaging operations.

3. The imager of claim 1, the conveying structure to move the display medium at a first velocity with a first zone including the machine-readable-coder reader, at a second velocity within a second zone including the erasing unit, and a third velocity within a third zone including the writing unit, wherein each respective velocity is selectably different from each other.

4. The imager of claim 1, wherein the validation module determines a validity of the display medium according to at least one of:
   the machine-readable-code reader according to at least one of a presence and a content of the machine-readable-code on the display medium;
   a physical structure to filter the display medium according to at least physical parameters of the display medium; and
   an electrical element to filter the display medium according to at least electrical parameters of the display medium.

5. The imager of claim 4, wherein the physical structure is closer to the display medium than the writing unit to ensure a minimum clearance between a face of the display medium and the writing unit.

6. The imager of claim 1, comprising:
   an array of location sensors arranged in series and spaced apart along the travel path, each location sensor to identify a presence or absence of the display medium at each respective location of a corresponding sensor.

7. An imager comprising:
   a frame defining, at least, a travel path along a first orientation;
   an ion-emitting erasing unit and an ion-emitting writing unit, both located along the travel path with the writing unit spaced apart downstream from the erasing unit;
   a conveying structure to move and releasably support a passive e-paper display medium in the first orientation in spaced relation to receive airborne ions from at least one of the respective erasing and writing units for imaging operations, the conveying structure to releasably support the display medium via releasable engagement of opposite faces of the display medium; and
   a conductive element to releasably contact a first conductive portion of a side edge of the display medium to establish electrical communication between a power supply and the first conductive portion, the side edge generally perpendicular to the faces of the display medium, wherein the conductive element is separate from, and independent of, the conveying structure.

8. The imager of claim 7, wherein the conductive element includes a plurality of conductive elements with at least one first conductive element located at generally the same position along the travel path as the erasing unit and at least one second conductive element located at generally the same position along the travel path as the writing unit, the at least one first conductive element spaced apart from, and independent of, the at least one second conductive element.

9. The imager of claim 8, wherein the conveying structure includes a pair of conveying structures laterally spaced apart in the second orientation to be positioned laterally externally to a writable portion of the travel path, and wherein the frame includes a window having side edges positioned laterally external to the writable portion of the travel path at least in the region of the writing unit.

10. The imager of claim 7, comprising:
a validation arrangement to permit target content imaging operations via the respective erasing and writing units upon a determination the display medium is valid and to prevent target content imaging operations upon a determination that the display medium is invalid, wherein the conductive element forms part of the validation arrangement.

11. The imager of claim 10, wherein the validation arrangement comprises at least one of:
a machine-readable-code reader to read machine-readable-code on display medium and to determine a validity of the display medium according to at least one of:
a presence or absence of the machine-readable-code;
a location of the machine-readable-code; and
a content of the machine-readable-code;
a physical structure to filter the display medium according to physical parameters of the display medium; and
an electrical element to filter the display medium according to electrical parameters of the display medium, wherein the electrical filter includes the conductive element.

12. The imager of claim 7, comprising:
an image evaluation module including a camera aligned with the travel path to capture an image of the re-writable portion of the passive e-paper display medium, wherein the image evaluation module evaluates the captured image regarding at least one of:
an image quality parameter;
a defect detection parameter;
a color calibration parameter; and
a security indicia parameter.

13. An imager comprising:
a frame defining, at least, a travel path along a first orientation;
an ion-emitting erasing unit and an ion-emitting writing unit, both located along the travel path with the writing unit spaced apart downstream from the erasing unit;
a conveying structure to move and releasably support a passive e-paper display medium in the first orientation in spaced relation to receive airborne ions from at least one of the respective erasing and writing units for imaging operations, the conveying structure to releasably support the display medium via releasable engagement of side portions of the display medium to maintain exposure of a passive e-paper display of the display medium for imaging operations;
an array of location sensors arranged in series and spaced apart along the travel path, each location sensor to identify a presence or absence of the display medium at each respective location of a corresponding sensor;
a control portion to control forward and reverse movement, via the conveying structure, of the display medium along the travel path in coordination with the location sensors and in association with the validation arrangement; and
a validation arrangement, to operate in association with the control portion, to permit target-content imaging operations via the respective erasing and writing units upon a determination the display medium is valid and to prevent target-content imaging operations upon a determination that the display medium is invalid.

14. The imager of claim 13, wherein the target-content imaging operations are prevented via at least one of:
the control portion to instruct at least the respective writing unit not to perform imaging operations on the display medium while permitting forward movement of the display medium through an exit portion of the imager;
the control portion to instruct the respective writing unit to write content onto the display medium indicating invalidity while permitting forward movement of the display medium through an exit portion of the imager; and
the control portion to instruct the conveying structure, based on information from the location sensors, to reverse movement of the display medium prior to at least the writing unit to eject the display medium from the imager, without performing at least some imaging functions, through an entry portion of the imager.

* * * * *